US010767503B2

(12) United States Patent
Barainca et al.

(10) Patent No.: US 10,767,503 B2
(45) Date of Patent: Sep. 8, 2020

(54) STATOR ASSEMBLY WITH RETENTION CLIP FOR GAS TURBINE ENGINE

(71) Applicant: United Technologies Corporation, Farmington, CT (US)

(72) Inventors: Brian Barainca, Kennebunk, ME (US); Gary F. Fowler, Strafford, NH (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 350 days.

(21) Appl. No.: 15/618,903

(22) Filed: Jun. 9, 2017

(65) Prior Publication Data

US 2018/0355737 A1    Dec. 13, 2018

(51) Int. Cl.
  *F01D 9/04*   (2006.01)
  *F02C 3/04*   (2006.01)
  *F02K 3/06*   (2006.01)

(52) U.S. Cl.
  CPC ............ *F01D 9/042* (2013.01); *F01D 9/041* (2013.01); *F02C 3/04* (2013.01); *F02K 3/06* (2013.01); *F05D 2230/60* (2013.01); *F05D 2240/12* (2013.01); *F05D 2260/30* (2013.01)

(58) Field of Classification Search
  CPC . F01D 9/042; F01D 9/041; F02C 3/04; F02K 3/06; F05D 2260/30; F05D 2240/12; F05D 2230/60
  See application file for complete search history.

(56) References Cited

U.S. PATENT DOCUMENTS 4,452,564 A     6/1984  Conant et al.
5,575,691 A  *  11/1996  Matthews ............ H01R 13/426
                                                    439/744

(Continued)

FOREIGN PATENT DOCUMENTS

EP     1079075      2/2001
EP     1213483      6/2002

(Continued)

OTHER PUBLICATIONS

European Search Report for European Patent Application No. 18176651 completed Oct. 4, 2018.

*Primary Examiner* — Joseph J Dallo
*Assistant Examiner* — Kurt Philip Liethen
(74) *Attorney, Agent, or Firm* — Carlson, Gaskey & Olds, P.C.

(57) ABSTRACT

A stator assembly for a gas turbine engine according to an example of the present disclosure includes, among other things, a first shroud that extends about an axis to bound a flow path. The first shroud defines a first shroud opening. An airfoil has an airfoil body that extends from a first end portion. The first end portion is received in the first shroud opening and defines a retention aperture. A retention clip includes a body and at least one locking feature. The body extends between opposed clip end portions. The at least one locking feature is compressibly received through the retention aperture, and the least one locking feature is decompressible from the body to define a ramp sloping towards one of the clip end portions to limit movement of the airfoil relative to the first shroud when in the installed position.

20 Claims, 10 Drawing Sheets

(56) References Cited

U.S. PATENT DOCUMENTS

| | | | | |
|---|---|---|---|---|
| 5,846,050 A | * | 12/1998 | Schilling | F01D 9/04 |
| | | | | 415/135 |
| 6,296,443 B1 | * | 10/2001 | Newman | F01D 9/042 |
| | | | | 415/189 |
| 6,310,776 B1 | * | 10/2001 | Byrne | H01L 23/367 |
| | | | | 174/16.3 |
| 6,409,472 B1 | | 6/2002 | McMahon et al. | |
| 6,655,912 B2 | | 12/2003 | Bos | |
| 7,311,495 B2 | * | 12/2007 | Ashley | F01D 5/26 |
| | | | | 415/209.4 |
| 9,051,846 B2 | * | 6/2015 | Arilla | F01D 11/005 |
| 9,506,361 B2 | * | 11/2016 | Fielding | F01D 9/041 |
| 9,771,815 B2 | * | 9/2017 | Remy | F01D 25/246 |
| 2011/0029001 A1 | * | 2/2011 | Trieu | A61B 17/083 |
| | | | | 606/151 |
| 2014/0356158 A1 | | 12/2014 | Barnett | |
| 2016/0333715 A1 | * | 11/2016 | McCaffrey | F04D 29/526 |

FOREIGN PATENT DOCUMENTS

| | | |
|---|---|---|
| EP | 2072760 | 6/2009 |
| EP | 3088689 | 11/2016 |
| GB | 2272027 | 5/1994 |

* cited by examiner

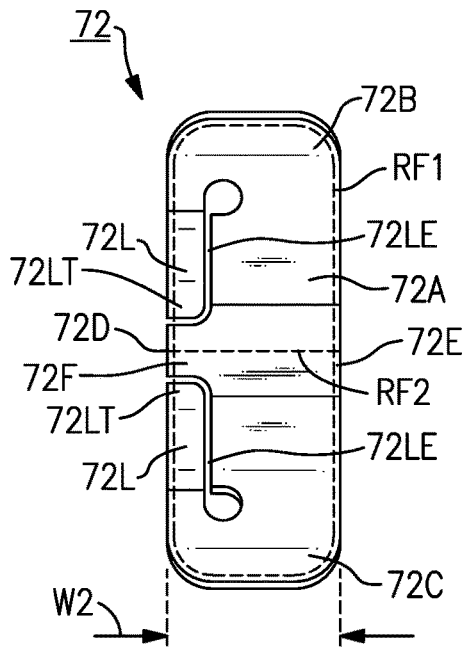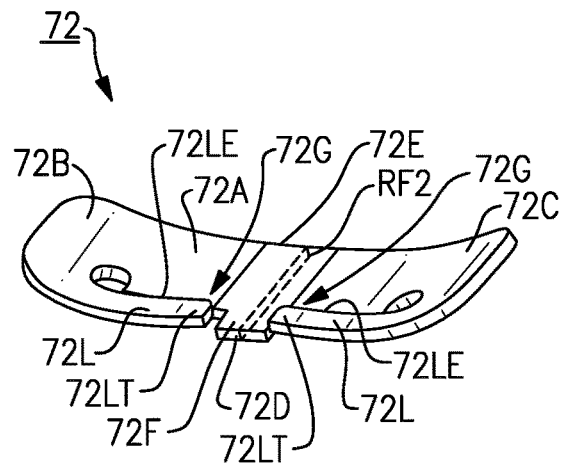
FIG.5B  FIG.5A
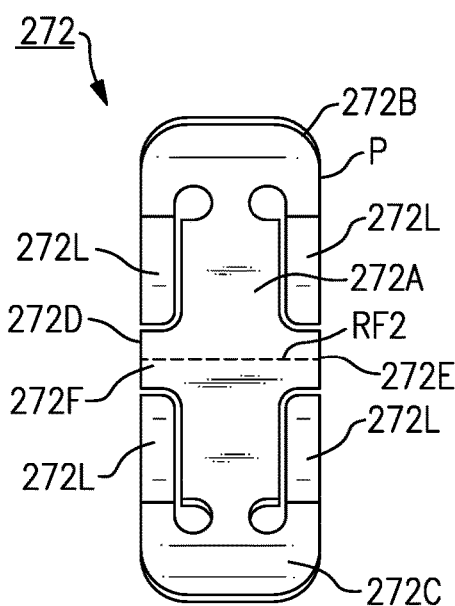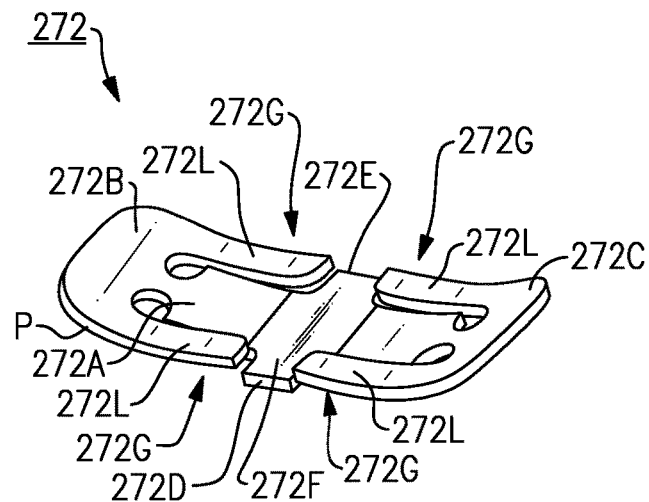
FIG.8B  FIG.8A

STATOR ASSEMBLY WITH RETENTION CLIP FOR GAS TURBINE ENGINE

BACKGROUND

This application relates to retention of components for a gas turbine engine, such as retention of a stator assembly.

Gas turbine engines are known, and typically include a fan delivering air into a low pressure compressor section. The air is compressed in the low pressure compressor section, and passed into a high pressure compressor section. From the high pressure compressor section the air is introduced into a combustion section where it is mixed with fuel and ignited. Products of this combustion pass downstream over a high pressure turbine section, and then a low pressure turbine section to extract energy for driving the fan.

Gas turbine engines typically include a stator assembly having airfoils to guide flow through a flow path. The airfoils are secured to portions of the stator assembly.

SUMMARY

A stator assembly for a gas turbine engine according to an example of the present disclosure includes a first shroud that extends about an axis to bound a flow path. The first shroud defines a first shroud opening. An airfoil has an airfoil body that extends from a first end portion. The first end portion is received in the first shroud opening and defines a retention aperture. A retention clip includes a body and at least one locking feature. The body extends between opposed clip end portions. The at least one locking feature is compressibly received through the retention aperture, and the least one locking feature is decompressible from the body to define a ramp sloping towards one of the clip end portions to limit movement of the airfoil relative to the first shroud when in the installed position.

In a further embodiment of any of the foregoing embodiments, the retention aperture is an elongated slot having a width that is greater than a width defined between opposed sidewalls of the body.

In a further embodiment of any of the foregoing embodiments, the retention aperture is dimensioned to cause the at least one locking feature to deflect toward the body when the retention clip is slideably received through the retention aperture.

In a further embodiment of any of the foregoing embodiments, the body defines a reference plane extending through the clip end portions, and wherein the at least one locking feature extends substantially along the reference plane in a first, compressed state, but extends outwardly from the reference plane in a second, decompressed state to define the ramp. In a further embodiment of any of the foregoing embodiments, the reference plane has a generally arcuate profile.

In a further embodiment of any of the foregoing embodiments, the at least one locking feature is an elongated tab having a terminal end that abuts against an external wall of the first end portion to oppose withdraw of the retention clip from the retention aperture when located in the installed position.

In a further embodiment of any of the foregoing embodiments, the at least one locking feature is substantially aligned with a sidewall of the body.

In a further embodiment of any of the foregoing embodiments, the at least one locking feature is spaced apart from sidewalls of the body.

In a further embodiment of any of the foregoing embodiments, the at least one locking feature includes a first locking feature having a first terminal end and a second locking feature having a second terminal end that faces toward the first terminal end.

In a further embodiment of any of the foregoing embodiments, each of the first and second locking features decompresses in a direction away from the airfoil body when in the installed position.

In a further embodiment of any of the foregoing embodiments, the retention clip defines a reference plane extending through opposed sidewalls of the body, and the retention clip is substantially symmetrical relative to the reference plane.

A gas turbine engine according to an example of the present disclosure includes a fan section that has a plurality of fan blades rotatable about an engine axis, a compressor section in fluid communication with the fan section, and a turbine section driving the fan section. A stator assembly has a first shroud and a second shroud each extending about the engine axis. The first shroud defines an array of first openings, and the second shroud defines an array of second openings. A plurality of airfoils each have an airfoil body extending between first and second end portions. The first end portion is situated in a respective one of the array of first openings, and the second end portion is situated in a respective one of the array of second openings. A plurality of retention clips each have an elongated body and a locking feature extending inwardly from a clip end portion of the body. The locking feature of each of the plurality of retention clips is compressibly received through a respective one of the first end portions to limit movement of the plurality of airfoils.

In a further embodiment of any of the foregoing embodiments, the stator assembly is situated in a bypass flow path aft of the fan section.

In a further embodiment of any of the foregoing embodiments, the stator assembly is an inlet guide vane assembly forward of the compressor section.

In a further embodiment of any of the foregoing embodiments, the first shroud bounds a radially inner portion of a flow path, and the second shroud bounds a radially outer portion of the flow path.

A method of assembling a stator assembly for a gas turbine engine according to an example of the present disclosure includes providing a shroud defining a shroud opening, and moving an end portion of an airfoil into the shroud opening. The end portion defines a retention aperture. The method includes the step of moving a clip end portion of a retention clip into the retention aperture to cause a locking feature of the retention clip to deflect inward and then through the retention aperture to cause the locking feature to decompress such that the retention clip limits movement of the airfoil relative to the shroud.

In a further embodiment of any of the foregoing embodiments, the locking feature is decompressible from a body of the retention clip to define a ramp sloping towards the clip end portion, and the retention aperture is an elongated slot dimensioned to contact the ramp.

In a further embodiment of any of the foregoing embodiments, the locking feature is an elongated tab having a terminal end that abuts against an external wall of the end portion of the airfoil to oppose withdraw of the retention clip from the retention aperture.

In a further embodiment of any of the foregoing embodiments, the retention clip defines a reference plane extending through opposed sidewalls of the body, and the retention clip is substantially symmetrical relative to the reference plane.

In a further embodiment of any of the foregoing embodiments, the locking feature includes a first locking feature having a first terminal end and a second locking feature having a second terminal end that faces toward the first terminal end.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 5A illustrates a perspective view of a retention clip.

FIG. 5B illustrates a top view of the retention clip of FIG. 5A.

FIG. 8A illustrates a perspective view of a retention clip according to a third example.

FIG. 8B illustrates a top view of the retention clip of FIG. 8A.

Like reference numbers and designations in the various drawings indicate like elements.

DETAILED DESCRIPTION

Figure 1:
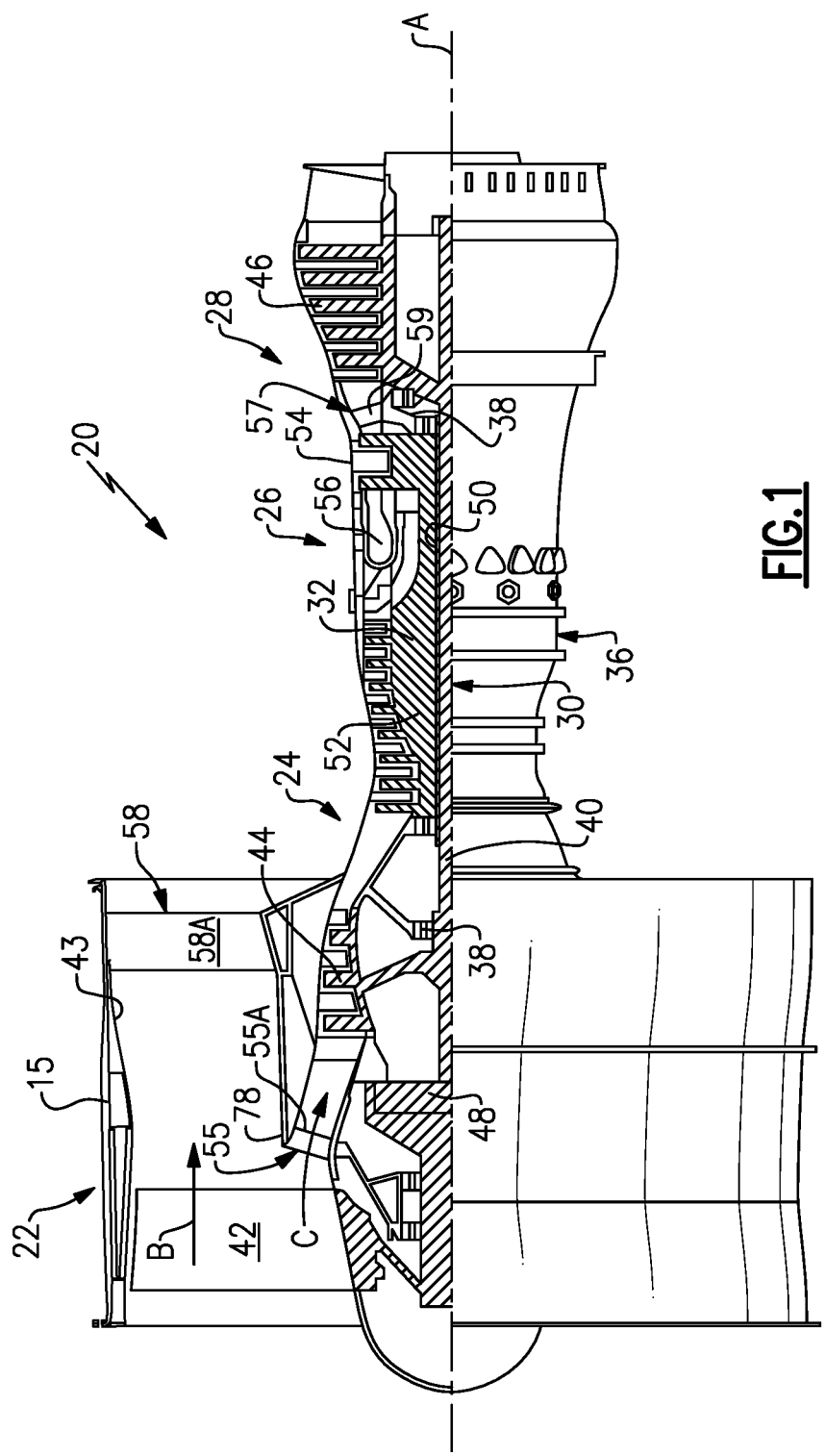
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{ R.})/(518.7° \text{ R.})]^{0.5}$. The "Low corrected fan tip speed" as disclosed herein according to one non-limiting embodiment is less than about 1150 ft/second (350.5 meters/second).

The engine 20 can include a structural guide vane (SGV) or bypass guide vane system 58 situated aft of the fan 42 in a bypass duct 43 defining the bypass flow path B. The bypass guide vane system 58 can include a plurality of airfoils 58A (one shown in FIG. 1) extending radially between an inner diameter and outer diameter of the bypass duct 43.

The engine 20 can include a fan exit stator (FES) or inlet guide vane assembly 55 downstream of the fan 42 and radially inward of a splitter 78. The inlet guide vane assembly 55 directs flow along the core flow path C from the fan 42 into the compressor section 24. The inlet guide vane assembly 55 can include a plurality of airfoils 55A (one shown in FIG. 1) arranged circumferentially about the engine central longitudinal axis A.

Figure 2:
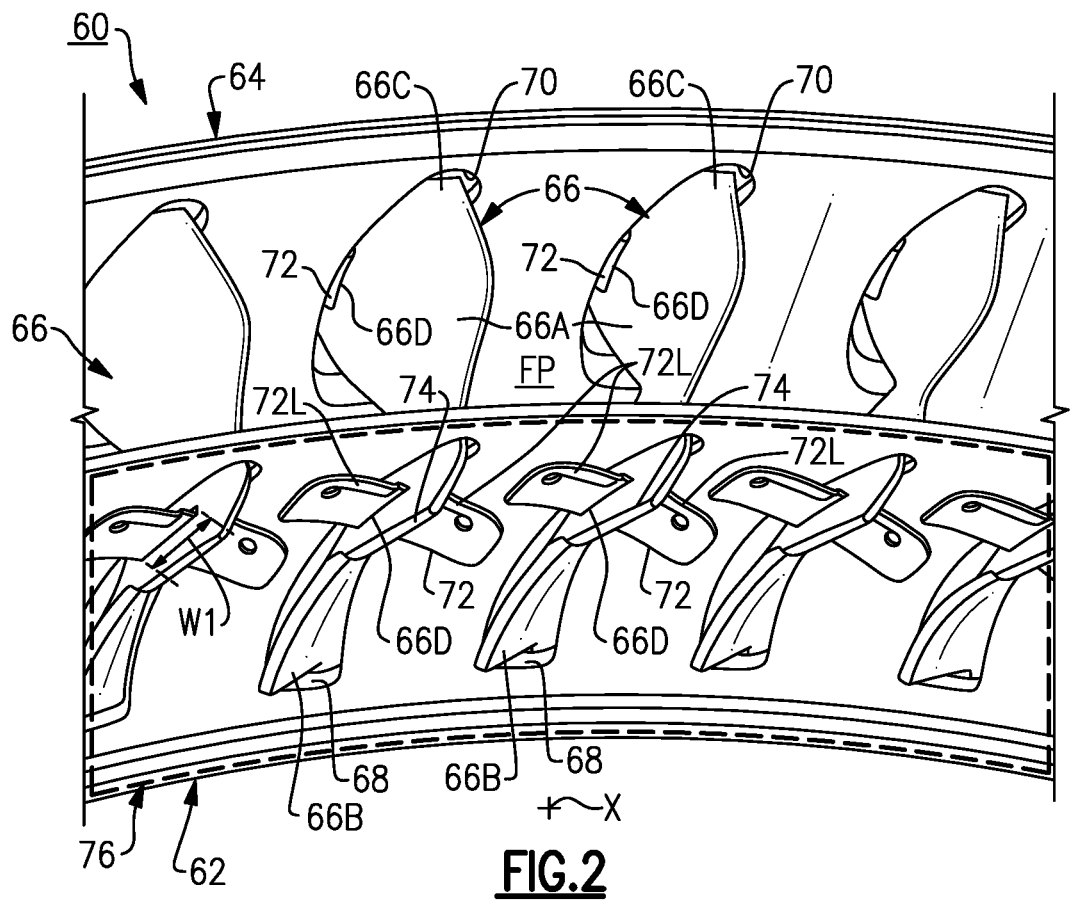
FIG. 2 illustrates a perspective view of an example stator assembly.
Figure 3:
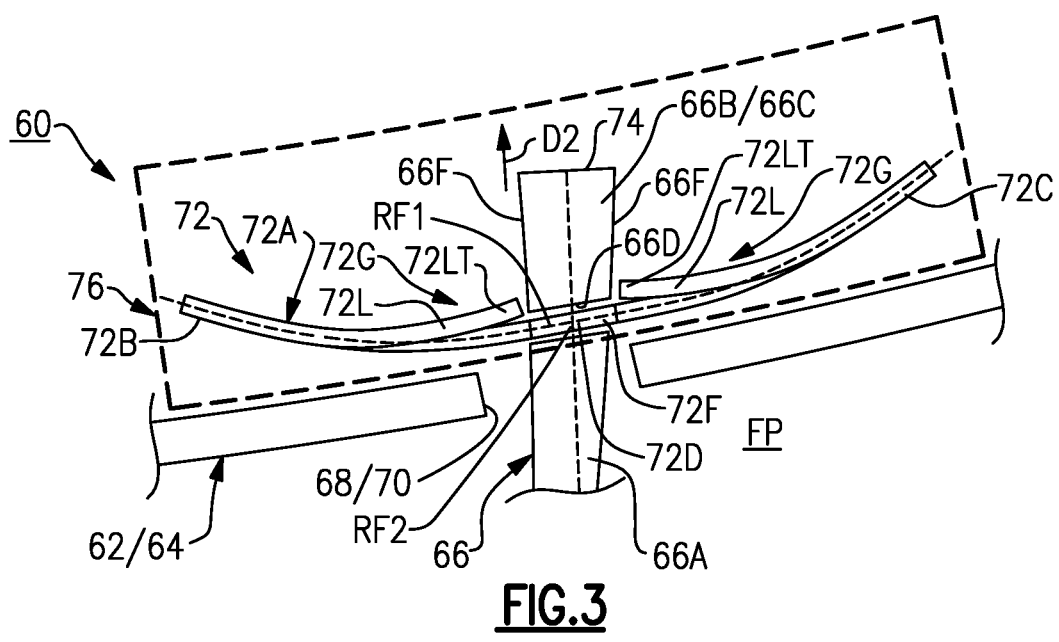
FIG. 3 illustrates a side view of portions of the stator assembly of FIG. 2.
Figure 4:
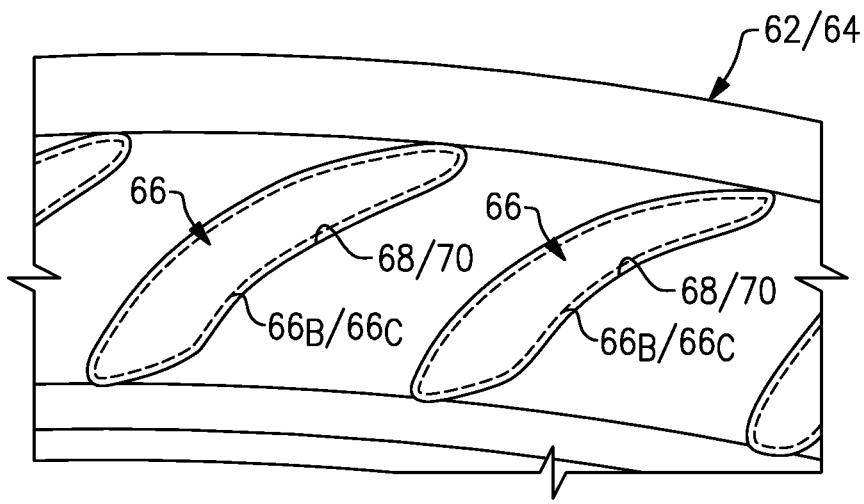
FIG. 4 illustrates a portion of the stator assembly of FIG. 2.

FIGS. 2-4 illustrate an example stator assembly 60 for guiding airflow through a flow path. In some examples, the stator assembly 60 is a portion of the inlet guide vane assembly 55 and/or the bypass guide vane system 58. The stator assembly 60 can also be utilized in the compressor section 24, turbine section 28 or mid-turbine frame 57. Other portions and components of the engine 20 can also benefit from the teachings herein, such as retention of combustor panels in the combustor section 26 or blade outer air seals (BOAS) in the turbine section 28.

The stator assembly 60 includes an inner (or first) shroud 62 and an outer (or second) shroud 64 each extending about an assembly axis X to bound a flow path FP (FIG. 2). The flow path FP may correspond to a portion of the bypass flow path B and/or the core flow path C, and the assembly axis X may correspond to the engine central longitudinal axis A in FIG. 1, for example. The stator assembly 60 includes an array of airfoils 66 that are arranged circumferentially about the assembly axis X to guide or direct flow through the flow path FP. Each of the airfoils 66 includes an airfoil body 66A that extends between a first end portion 66B and a second end portion 66C (see FIGS. 2-3).

The inner shroud 62 defines an array of inner (or first) shroud openings 68. The outer shroud 64 defines an array of outer (or second) shroud openings 70. As illustrated by FIG. 4, the shroud openings 68, 70 can be generally contoured relative to a perimeter of respective first and second end portions 66B, 66C of the airfoils 66 (shown in dashed lines).

The shroud openings 68, 70 receive respective first and second end portions 66B, 66C of the airfoils 66. For example, the inner shroud 62 can be positioned relative to the assembly axis X, with each of the airfoils 66 moved in a radially inward direction to be received in one of the first shroud openings 68. Thereafter, the outer shroud 64 can be moved radially inward to position the second end portion 66C of the airfoils 66 in the second shroud openings 70. In another example, the shrouds 62, 64 are situated relative to each other and the assembly axis X. Thereafter, one of the first and second end portions 66B, 66C of each of the airfoils 66 is inserted or otherwise situated in a respective one of the shroud openings 68, 70, such as first end portion 66B, and then the other one of the first and second end portions 66B, 66C is inserted or otherwise situated in a respective one of the shroud openings 68, 70.

Referring to FIGS. 5A-5B, with continued reference to FIGS. 2-4, the stator assembly 60 includes a plurality of retention clips 72 for selectively securing the airfoils 66 to the inner shroud 62 and/or the outer shroud 64. In the illustrated example of FIGS. 2-3, the first end portion 66B and the second end portion 66C of at least some of the airfoils 66 are mechanically coupled or otherwise secured to the inner and outer shrouds 62, 64 by one or more retention clips 72. In alternative examples, the first end portion 66B or the second end portion 66C can be mechanically coupled to the respective shroud 62, 64 by one or more fasteners.

Each retention clip 72 includes one or more locking features 72L that extend from body 72A. The body 72A can have a generally rectangular, elongated profile and can extend between opposed clip end portions 72B, 72C and between opposed sidewalls 72D, 72E adjacent to clip end portions 72B, 72C. The body 72A defines a reference plane RF1 (shown in dashed lines in FIGS. 3 and 5B) extending through the clip end portions 72B, 72C and the sidewalls 72D, 72E. The reference plane RF1 can have a generally arcuate profile. The generally arcuate profile of the retention clip 72, including the outward flaring of the clip end portions 72B, 72C relative to intermediate portion 72F of the body 72A, can be utilized by the operator to assist in installing and/or uninstalling the retention clip 72 in relatively small areas or clearances from shrouds 62, 64. In other examples, the reference plane RF1 is generally flat or planar (see, e.g., FIGS. 9A-9B).

The retention clip 72 can be formed from an extrusion or stamping process and made of a tempered metal or metal alloy, for example, with the body 72A of the retention clip 72 having a substantially uniform width along sidewalls 72D, 72E between the clip end portions 72B, 72C. These techniques can reduce the cost of fabricating the retention clips 72. Other example techniques for fabricating the retention clips 72 can include a casting or machining process.

Each of the locking features 72L can be in the shape of an elongated tab or tine that is cut or otherwise formed from the body 72A. Each locking feature 72L can have a generally rectangular profile that extends inwardly from one of the clip end portions 72B, 72C and terminates at a terminal end 72LT. The terminal end 72LT can be rounded (see, e.g., FIG. 5B) or substantially rectangular (see, e.g., FIG. 9A), for example, and can be bent or otherwise formed with respect to the body 72A to provide a spring action. Each locking feature 72L can be substantially aligned with one of the sidewalls 72D, 72E of the body 72A. In the illustrated example of FIGS. 5A-5B, the retention clip 72 includes a pair of locking features 72L that each extend outwardly from a concave side that is opposite of a convex side of the body 72A with respect to reference plane RF1. In other examples, the retention clip 72 includes fewer or greater than two locking features 72L.

The first and/or second end portions 66B, 66C of the airfoils 66 define a plurality of retention apertures 66D (FIG. 3). The retention apertures 66D and respective passages through the end portions 66B, 66C can have a generally complementary profile with respect to a cross-section of the body 72A of the retention clip 72. For example, the retention aperture 66D can be an elongated slot having a width W1 (FIG. 2) that is greater than a width W2 (FIG. 5B) defined between the opposed sidewalls 72D, 72E of the body 72A.

At least one of the locking features 72L of each retention clip 72 is compressibly received through the retention aperture 66D of a respective one of the first and second end portions 66B, 66C such that the retention clip 72 limits or bounds movement of the respective airfoil 66 relative to one of the shrouds 62, 64. The retention aperture 66D can be dimensioned to cause the locking feature 72L to deflect in a direction D1 (FIG. 6) toward the body 72A when the retention clip 72 is slideably received into or through the retention aperture 66D, and to cause the locking feature 72L to decompress in a direction D2 (FIGS. 3 and 6) away from the airfoil body 66A when in the installed position. The retention apertures 66D can be defined at a position relative to the first and/or second end portions 66B, 66C of the airfoils 66 such that the retention clips 72 are spaced a distance from the respective shrouds 62, 64 to accommodate tolerance stack ups of the stator assembly 60 and reduce a likelihood of corrosion in examples in which the different materials of the components are utilized. In alternative examples, the retention apertures 66D are defined such that surfaces of the retention clip 72 directly contact an adjacent one of the shrouds 62, 64 when in the installed position.

Each locking feature 72L can be decompressible from the body 72A to define a ramp 72G sloping towards one of the clip end portions 72B, 72C to limit movement of the airfoil 66 relative to the respective shroud 62, 64 when in the installed position. For example, each of the locking features 72L can extend substantially along the reference plane RF1 in a first, compressed state (see, e.g., FIG. 6), but can extend outwardly from the reference plane RF1 in a second, decompressed state to define the ramp 72G (see, e.g., FIG. 3). The ramp 72G established by the locking feature 72L can be contoured or gradually sloped to assist in guiding the retention clip 72 through one of the retention apertures 66D.

The retention clip 72 can define a reference plane RF2 extending through opposed sidewalls 72D, 72E of the body 72A. The body 72A and each locking feature 72L can be dimensioned such that the retention clip 72 is substantially symmetrical relative to the reference plane RF2 to assist the operator in installing the retention clip 72 in the desired orientation and position. For example, the locking features 72L can be substantially aligned with each other, but can be located on opposite sides of the reference plane RF2. In other examples, the locking features 72L are offset from each other relative to the reference plane RF2 such that the locking features 72L are at different distances relative to a common one of the sidewalls 72D, 72E. As can be seen in FIGS. 5A-5B, the intermediate portion 72F of the body 72A can at least partially overlap with an inner edge 72LE of the locking feature 72L with respect to the reference plane RF2. The intermediate portion 72F can be dimensioned such that the locking features 72L and the body 72A provide a substantially smooth and continuous surface for guiding the retention clip 72 through the retention aperture 66D.

The terminal end 72LT of each locking feature 72L can be dimensioned to abut against an external wall 66F of a ridge 74 (FIG. 3) of one of the adjacent end portions 66B, 66C to oppose axial withdraw of the retention clip 72 from the retention aperture 66D when located in an installed position and the retention clip 72 is permitted to at least partially spring back or otherwise decompress. In some examples, the terminal ends 72LT is dimensioned to provide a clearance between the terminal end 72LT and the external walls 66F of the ridge 74 to accommodate for tolerances of the components. The terminal ends 72LT can be defined such that the clip end portions 72B, 72C are positioned approximately equidistant from an adjacent ridge 74 and extend outward relative to the body 72A to reduce a likelihood of rocking of the retention clip 72 about the ridge 74. In the illustrated example of FIGS. 5A-5B, the retention clip 72 includes a pair of locking features 72L having opposed terminal ends 72LT that face towards each other to abut against opposed external sidewalls 66F of the airfoil 66. When in the installed position, the opposed pair of locking features 72L clamp to, or otherwise securely engage, the adjacent ridge 74 to resist movement of the retention clip 72 relative to the respective shroud 62, 64.

The stator assembly 60 can include one or more secondary retention members 76 (shown in dashed lines in FIGS. 2 and 3) formed adjacent to the end portions 66B, 66C to secure the airfoils 66 to the shrouds 62, 64. Each secondary retention member 76 can include one or more portions arranged about the assembly axis X to define a ring. Each secondary retention member 76 may comprise an elastic material, such as a polymer or other rubber based substance, which may at least partially absorb impacts or dampen vibrations in the surrounding portions of the stator assembly 60. In one example, the secondary retention member 76 is made from a vulcanized silicon rubber.

Material of the secondary retention member 76 can be deposited at suitable locations relative to the stator assembly 60. In the illustrated example, the secondary retention member 76 can be formed in the spaces between the respective shrouds 62, 64, the end portions 66B, 66C and the retention clips 72. The secondary retention member 76 traps or otherwise opposes withdrawal of the retention clips 72 from the retention apertures 66D, which further reduces a likelihood of the retention clips 72 becoming dislodged from the end portions 66B, 66C and liberation of one or more of the airfoils 66. The generally arcuate profile of the retention clip 72 also provides additional space between the retention clip 72 and a respective one of the shrouds 62, 64 for receiving material of the secondary retention member 76 to secure the airfoils 66 and retention clips 72.

Figure 6:
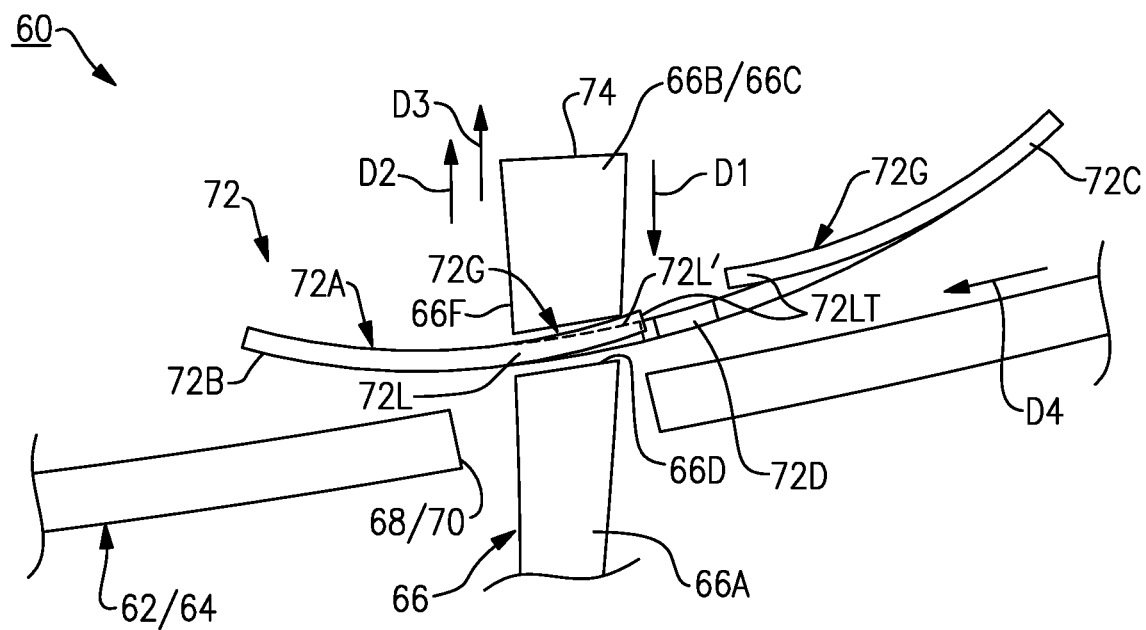
FIG. 6 illustrates a side view of portions of the stator assembly of FIG. 2 with a retention clip in a partially installed position.

Referring to FIG. 6, the retention clip 72 can be installed as follows. The airfoil 66 is moved in a direction D3 such that the end portion 66B/66C is received through the respective shroud opening 68/70. Thereafter, one of the clip end portions 72B, 72C of the retention clip 72 is moved in a direction D4 and into the retention aperture 66D to cause a leading one of the locking features 72L defining ramp 72G to contact the retention aperture 66D and deflect inward relative to the body 72A. The retention clip 72 can be dimensioned such that each locking feature 72L is substantially flush with the body 72A when deflected inwardly toward the body 72A to assist in guiding the retention clip 72 through the retention aperture 66D (depicted by 72L' in dashed lines).

One of the clip end portions 72B, 72C of the retention clip 72 is slideably received or otherwise continues to move in the direction D4 through the retention aperture 66D to cause or otherwise permit a leading one of the locking features 72L to flex outwardly or otherwise decompress such that the terminal end 72LT of the locking feature 72L abuts against the exterior wall 66F of the end portion 66B/66C and the retention clip 72 limits or otherwise opposes movement of the airfoil 66 relative to the shroud 62/64. The terminal ends 72LT can be dimensioned to provide a clearance between the terminal end 72LT and the external wall 66F of the ridge 74 such that the respective terminal end 72LT abuts against the external wall 66F in response to movement of the retention clip 72 in a direction opposite to direction D4. The secondary retention member 76 (FIGS. 2-3) can be formed around portions of the retention clip 72 and the end portion 66B/66C of the airfoil 66 to secure the retention clip 72.

To disassemble the stator assembly 60, at least a portion of the secondary retention member 76 can be removed. The terminal end 72LT of one of the locking features 72L can be moved in the direction D1 to deflect the locking feature 72L inward relative to the body 72A or otherwise compress the retention clip 72, and then the retention clip 72 can be moved in a direction opposite to direction D4 to remove the retention clip 72 from the retention apertures 66D. Thereafter, the airfoil 66 can be moved in a direction opposite to direction D3 to remove the airfoil 66 from the shroud opening 68/70.

Figure 7A:
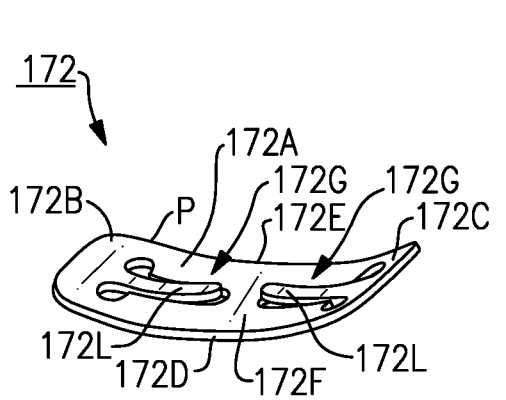
FIG. 7A illustrates a perspective view of a retention clip according to a second example.
Figure 7B:
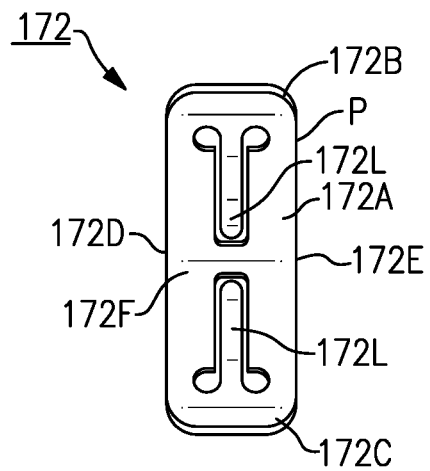
FIG. 7B illustrates a top view of the retention clip of FIG. 7A.
Figure 7C:
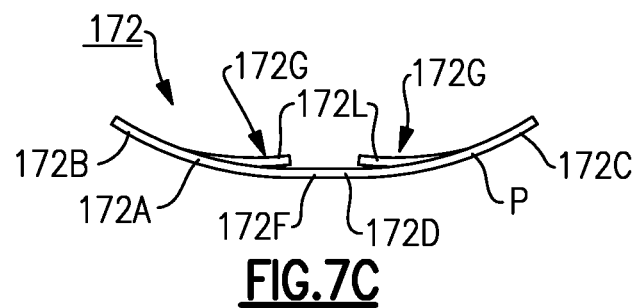
FIG. 7C illustrates a side view of the retention clip of FIG. 7A.

FIGS. 7A-7C illustrate a retention clip 172 according to a second example. The retention clip 172 includes one or more locking features 172L each extending inwardly from a respective clip end portion 172B, 172C.

Each locking feature 172L is spaced apart from sidewalls 172D, 172E of the retention clip 172 and are defined inwardly from a perimeter P of body 172A.

FIGS. 8A-8B illustrate a retention clip 272 according to a third example. The retention clip 272 includes one or more locking features 272L each extending inwardly from a respective clip end portion 272B, 272C. Each locking feature 272L is defined along a respective sidewall 272D, 272E of the retention clip 272 and are defined along a perimeter P of the retention clip 272. In the illustrated example, the retention clip 272 includes four locking features 272L each extending inwardly from a respective corner of the retention clip 272.

Figure 9A:
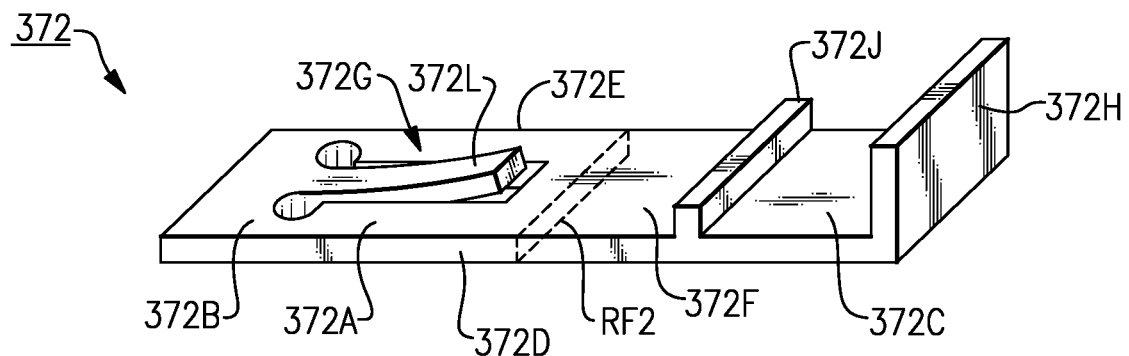
FIG. 9A illustrates a perspective view of a retention clip according to a fourth example.
Figure 9B:
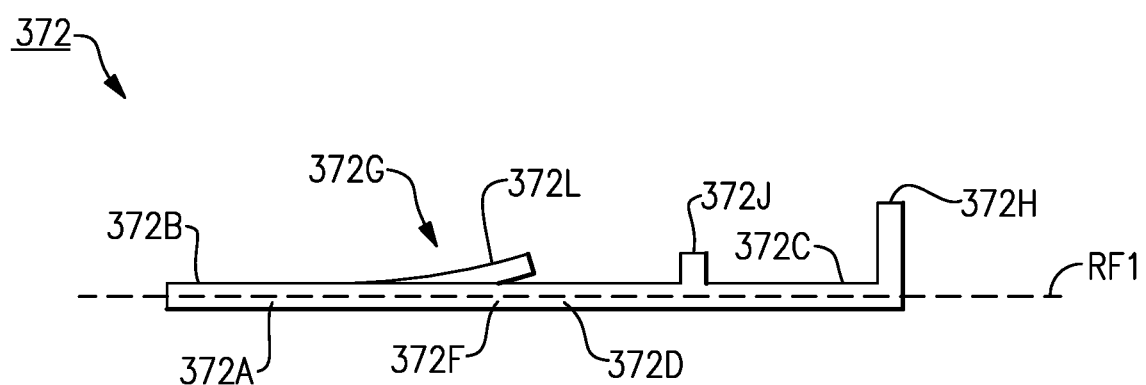
FIG. 9B illustrates a top view of the retention clip of FIG. 9A.
Figure 10:
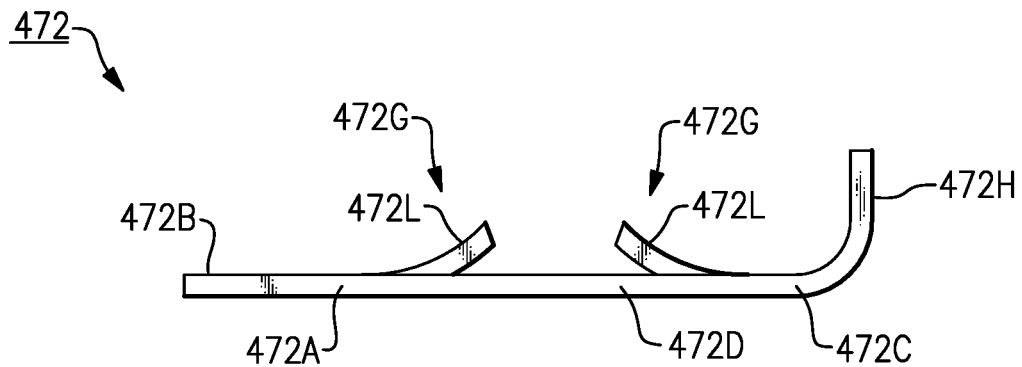
FIG. 10 illustrates a perspective view of a retention clip according to a fifth example.

FIGS. 9A-9B illustrate a retention clip 372 according to a fourth example. The retention clip 372 includes at least one locking feature 372L extending inwardly from clip end portion 372B of body 372A. The body 372A defines reference plane RF1 such that the retention clip 372 is substantially flat or planar. The retention clip 372 is asymmetrical with respect to reference plane RF2. The retention clip 372 can have a handle 372H extending from the body 372A, such as from clip end portion 372C, to assist an operator in installing and/or uninstalling the retention clip 372. The retention clip 372 can include a raised protrusion or step 372J extending outwardly from the body 372A. The step 372J can be defined at a position relative to the clip end portions 372B, 372C and/or locking feature 372L to abut against the external wall 66F of one of the end portions 66B, 66C of the airfoils 66 (FIG. 6) at a desired depth or distance. The step 372J can be dimensioned to provide for a small clearance between the step 372J and the respective external wall 66F to accommodate for tolerances of the components. In other examples, step 372J can be omitted (see, e.g., retention clip 472 of FIG. 10 according to a fifth example).

Figure 11A:
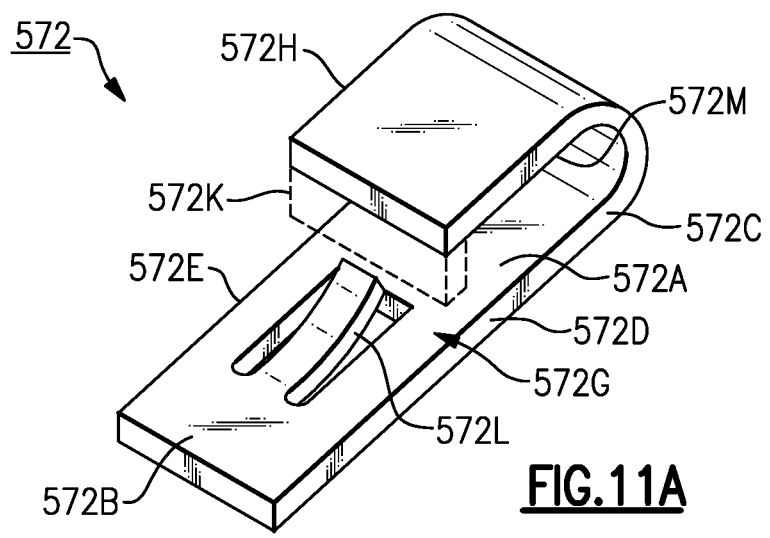
FIG. 11A illustrates a perspective view of a retention clip according to a sixth example.
Figure 11B:
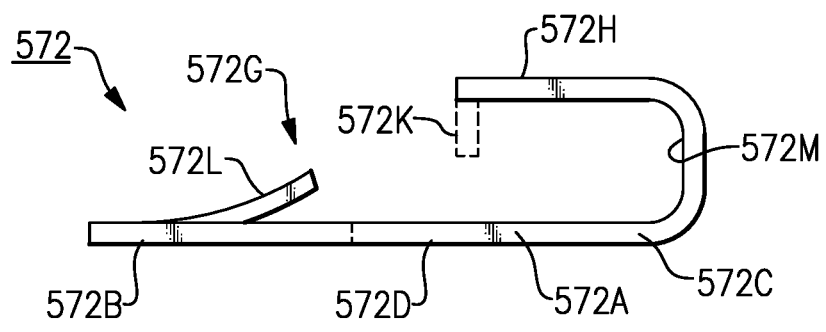
FIG. 11B illustrates a side view of the retention clip of FIG. 11A.

FIGS. 11A and 11B illustrate a retention clip 572 according to a sixth example. Retention clip 572 includes a handle 572H that curves outward from clip end portion 572C and back toward opposed clip end portion 572B such that a side profile of a portion of the retention clip 572 has a generally U-shaped geometry. The handle 572 defines a clip cavity 572M with a body 572A of the retention clip 572 that can receive material of the secondary retention member (see, e.g., 76 at FIGS. 2-3) to further secure the retention clip 572 during assembly. The geometry of the handle 572H can also assist an operator in installing and/or uninstalling the retention clip 572, for example. Retention clip 572 can include an abutment member 572K (shown in dashed lines) to provide additional contact surfaces for abutment with one of the end portions 66B, 66C of airfoils 66 (see FIG. 6), which can reduce rocking of the retention clip 572 when in an installed position. The abutment member 572K can extend from the handle 572H in a direction towards the body 572A.

Figure 12A:
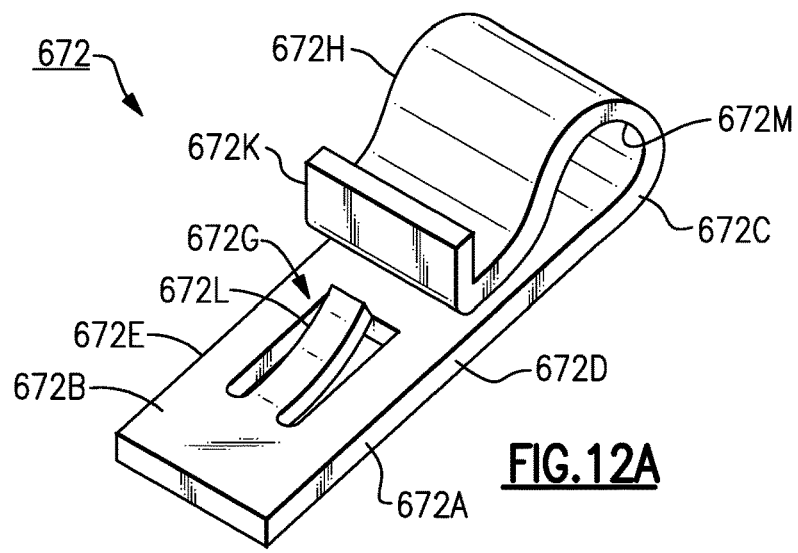
FIG. 12A illustrates a perspective view of a retention clip according to a seventh example.
Figure 12B:
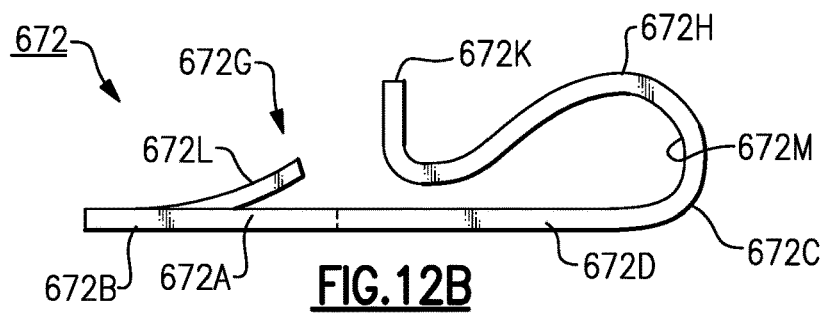
FIG. 12B illustrate a side view of the retention clip 672 of FIG. 12A.

FIGS. 12A and 12B illustrate a retention clip 672 according to a seventh example. Handle 672H slopes towards body 672A such that a cross-section of clip cavity 672M is substantially closed to trap additional material of the secondary retention member (see, e.g., 76 at FIGS. 2-3), for example. Abutment member 672K can extend from the handle 672H in a direction away the body 672A, which can reduce rocking of the retention clip 572.

Figure 13:
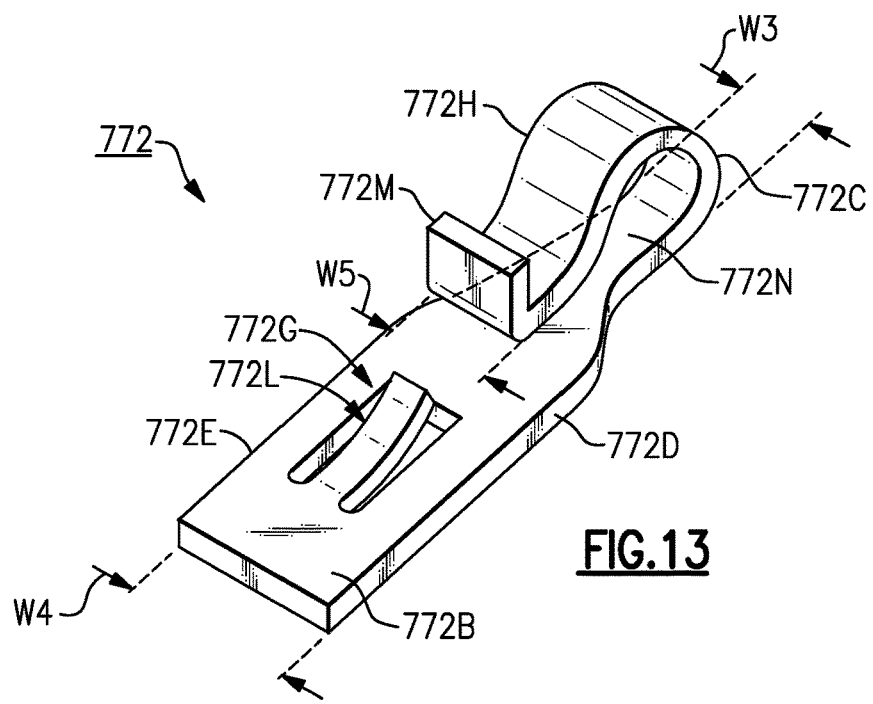
FIG. 13 illustrates a perspective view of a retention clip according to an eighth example.

FIG. 13 illustrates a retention clip 772 according to an eighth example. Clip end portion 772C can define a width W3 that is less than a width W4 defined by opposed clip end portion 772B to define a narrowed portion or neck 772N. A geometry of the neck 772N can reduce material and weight of the retention clip 772. Abutment member 772K can define a width W5 that is substantially equal to width W3. In other examples, width W3 and width W5 differ.

Figure 14A:
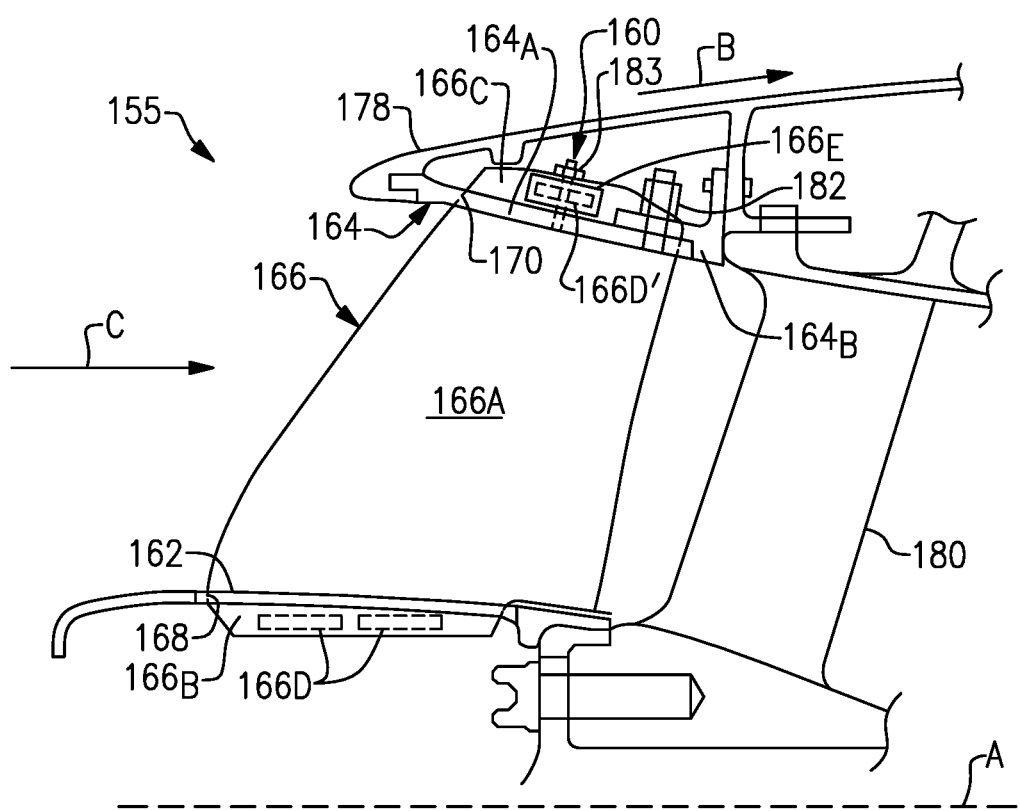
FIG. 14A illustrates an example inlet guide vane assembly.
Figure 14B:
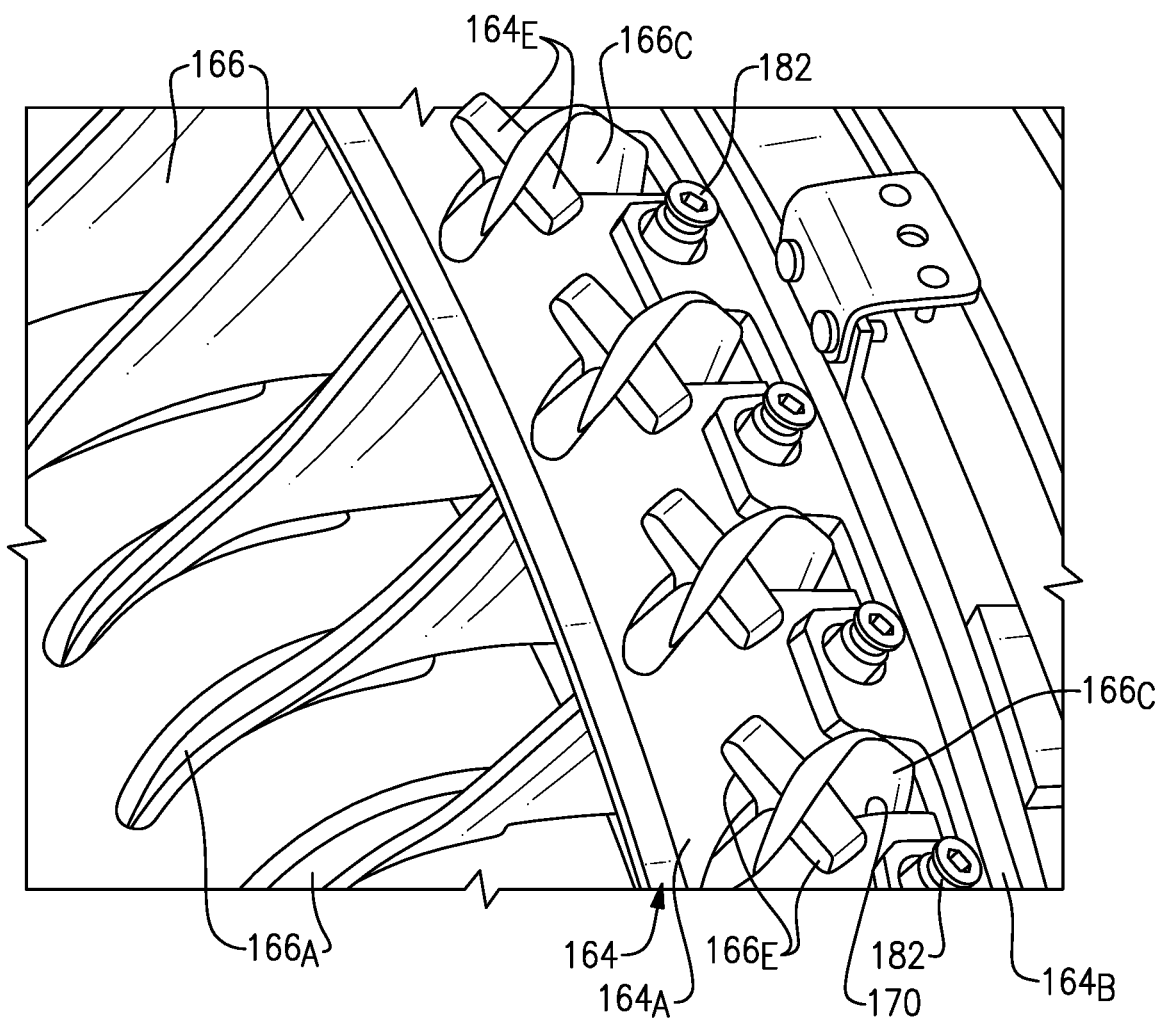
FIG. 14B illustrates a shroud for the inlet guide vane assembly of FIG. 14A.

FIGS. 14A and 14B illustrate an example inlet guide vane assembly 155. The inlet guide vane assembly 155 can be utilized in the engine 20, for example. In the illustrated example, a stator assembly 160 is situated at a splitter 178. The splitter 178 directs airflow to the bypass and core flow paths B, C. The stator assembly 160 can be situated forward of one or more vanes 180 that can be situated upstream of a compressor section, such as the low pressure compressor 44 of engine 20.

The stator assembly 160 includes inner and outer (or first and second) shrouds 162, 164 defining shroud openings 168, 170. One of the end portions 166B, 166C of airfoils 166 (one shown) defines one or more retention apertures 166D, 166D'. In the illustrated example, an inner (or first) end portion 166B of the airfoil 166 defines the retention aperture 166D. The retention apertures 166D can be configured to receive a respective retention clip, including any of the retention clips disclosed herein.

The outer shroud 164 can include a forward (or first) portion 164A and an aft (or second) portion 164B mechanically attached or otherwise secured to each other with one or more fasteners 182 (one shown). The forward and aft portions 164A, 164B can each have a generally annular geometry extending about the engine central longitudinal axis A, as illustrated by FIG. 14B. In some examples, the inner shroud 162 can include forward and aft portions similar to the outer shroud 164. In alternative examples, the outer shroud 164 includes a single annular portion (see, e.g., shroud 64 of FIG. 2).

The inner or outer end portions 166B, 166C of airfoils 166 can include an attachment portion such as a set of outwardly extending tabs 166E. One or more secondary retention members (see, e.g., 76 at FIGS. 2-3) can be formed adjacent to the tabs 166E. In another example, the tabs 166E are mechanically attached or other secured to the respective inner or outer shrouds 162, 164 with one or more fasteners 183 (one shown in dashed lines in FIG. 14A), such as rivets or bolts and nuts. In some examples, one or more retention apertures 166D' (shown in dashed lines) can be defined in the outer end portion 166C of each airfoil 166 to receive retention clips, and the tabs 166E can be omitted. The inner end portion 166B and the outer end portion 166C of at least some of airfoils 166 can be secured to the shrouds 162, 164 with one or more retention clips, including any of the retention clips disclosed herein, with one or more secondary retention members (see, e.g., 76 at FIGS. 2-3) formed adjacent to each of the end portions 166B, 166C to secure the retention clips.

The retention clips disclosed herein can secure airfoils or other components of the engine 20 within relatively small clearances and spaces. The retention clips disclosed herein can also be made in a simplified manner to reduce system complexity, and can be dimensioned to be substantially symmetrical to reduce a likelihood of improper installation.

One or more embodiments have been described. Nevertheless, it will be understood that various modifications may be made. For example, when reengineering from a baseline engine configuration, details of the baseline may influence details of any particular implementation. Accordingly, other embodiments are within the scope of the following claims.

What is claimed is:

1. A stator assembly for a gas turbine engine comprising:
   a first shroud extending about an axis to bound a flow path, the first shroud defining a first shroud opening;
   an airfoil including an airfoil body extending from a first end portion, the first end portion received in the first shroud opening and defining a retention aperture; and
   a retention clip including a body and at least one locking feature extending from the body, the body extending between opposed clip end portions and between opposed sidewalls that cooperate to establish a perimeter of the body, the at least one locking feature compressibly received through the retention aperture, and the at least one locking feature decompressible from the body to define a ramp sloping towards one of the clip end portions to limit movement of the airfoil relative to the first shroud when in the installed position; and
   wherein the at least one locking feature is an elongated tab having a terminal end that abuts against an external wall of the first end portion to oppose withdraw of the retention clip from the retention aperture when located in the installed position; and
   wherein the body a reference plane extending through the clip end portions and through the sidewalls of the body, wherein the at least one locking feature extends along the reference plane in a first, compressed state, but extends outwardly from the reference plane in a second, decompressed state to define the ramp, and wherein the reference plane has an arcuate profile establishing opposed concave and convex sides of the body.

2. The stator assembly as recited in claim 1, wherein the retention aperture is an elongated slot having a width that is greater than a width defined between the sidewalls of the body.

3. The stator assembly as recited in claim 2, wherein the retention aperture is dimensioned to cause the at least one locking feature to deflect toward the body when the retention clip is slideably received through the retention aperture.

4. The stator assembly as recited in claim 1, wherein the at least one locking feature is aligned with a respective one of the sidewalls of the body.

5. The stator assembly as recited in claim 1, wherein the at least one locking feature is spaced apart from the sidewalls of the body.

6. The stator assembly as recited in claim 1, wherein the at least one locking feature includes a first locking feature and a second locking feature, and the terminal end of the first locking feature faces toward the terminal end of the second locking feature.

7. The stator assembly as recited in claim 6, wherein each of the first and second locking features decompresses in a direction away from the airfoil body when in the installed position.

8. The stator assembly as recited in claim 6, wherein the retention clip is symmetrical relative to a second reference plane, the second reference plane extends through the sidewalls and is spaced apart from the clip end portions, and the first and second locking features are located on opposite sides of the second reference plane.

9. The stator assembly as recited in claim 6, wherein:
   the first and second locking features are spaced apart by the body; and
   the first and second locking features are independently deflectable relative to the body.

10. The stator assembly as recited in claim 9, wherein the first and second locking features are received in respective openings defined in the body in response to respectively deflecting the first and second locking features toward the body.

11. The stator assembly as recited in claim 8, wherein the elongated tab extends outwardly from the concave side in the second, decompressed state.

12. A gas turbine engine comprising:
   a fan section including a plurality of fan blades rotatable about an engine axis;
   a compressor section in fluid communication with the fan section;
   a turbine section driving the fan section; and
   a stator assembly comprising:
      a first shroud and a second shroud each extending about the engine axis, the first shroud defining an array of first openings, and the second shroud defining an array of second openings;
      a plurality of airfoils each including an airfoil body extending between first and second end portions, the first end portion situated in a respective one of the array of first openings, and the second end portion situated in a respective one of the array of second openings; and
      a plurality of retention clips each including an elongated body and at least one locking feature, the body extending between opposed clip end portions and between opposed sidewalls that cooperate to establish a perimeter of the body, the at least one locking feature extending inwardly from a respective one of the clip end portions of the body, and the at least one locking feature of each of the plurality of retention clips compressibly received through a respective one of the first end portions to limit movement of the plurality of airfoils;
   wherein the body defines a reference plane extending through the clip end portions and through the sidewalls of the body, and wherein the at least one locking feature extends along the reference plane in a first, compressed state, but extends outwardly from the reference plane in a second, decompressed state to define the ramp sloping towards one of the clip end portions, and wherein the reference plane has an arcuate profile establishing opposed concave and convex sides of the body; and wherein the at least one locking feature is an elongated tab having a terminal end that abuts against an external wall of the first end portion in the second, decompressed state to oppose withdraw of a respective one of the plurality of retention clips from a retention aperture of the first end portion when located in the installed position.

13. The gas turbine engine as recited in claim 12, wherein the stator assembly is situated in a bypass flow path aft of the fan section.

14. The gas turbine engine as recited in claim 12, wherein the stator assembly is an inlet guide vane assembly forward of the compressor section.

15. The gas turbine engine as recited in claim 12, wherein the first shroud bounds a radially inner portion of a flow path, and the second shroud bounds a radially outer portion of the flow path.

16. A method of assembling a stator assembly for a gas turbine engine comprising:

providing a shroud defining a shroud opening;

moving an end portion of an airfoil into the shroud opening, the end portion defining a retention aperture; and moving a retention clip relative to the retention aperture, wherein the retention clip includes a body and at least one locking feature extending from the body, the body extends between opposed clip end portions and between opposed sidewalls that cooperate to establish a perimeter of the body, the at least one looking feature is decompressible from the body to define a ramp sloping towards one of the clip end portions, and including moving one of the clip end portions into the retention aperture to cause the at least one locking feature to compress such that the at least one locking feature deflects inward and then through the retention aperture to cause the at least one locking feature to decompress such that the retention clip limits movement of the airfoil relative to the shroud; and wherein the at least one locking feature is an elongated tab having a terminal end that abuts against an external wall of the end portion of the airfoil to oppose withdraw of the retention clip from the retention aperture; and wherein the body defines a reference plane extending through the clip end portions and through the sidewall of the body, wherein the at least one locking feature extends along the reference plane in response to the compressing, but extends outwardly from the reference plane in response to the decompressing to define the ramp, and wherein the reference plane has an arcuate profile establishing opposed concave and convex sides of the body.

17. The method as recited in claim 16, wherein the the retention aperture is an elongated slot dimensioned to contact the ramp.

18. The method as recited in claim 17, wherein the at least one locking feature includes a first locking frame and a second locking feature, the retention clip is symmetrical relative to a second reference plane, the second reference plane extends through the opposed sidewalls and is spaced apart from the clip end portions, and the first and second locking features are located on opposite sides of the second reference plane.

19. The method as recited in claim 16, wherein the at least one locking feature includes a first locking feature and a second locking feature, and the terminal end of the first locking feature faces toward the terminal end of the second locking feature.

20. The method as recited in claim 19, wherein:

the first and second locking features are spaced apart by the body of the retention clip;

the first and second locking features are independently deflectable relative to the body;

the terminal ends of the first and second locking features are dimensioned to abut against opposed sides of the external wall to limit movement of the airfoil relative to the shroud; and the first and second locking features define a first distance between the terminal ends of the first and second locking features in response to the first and second locking features deflecting inward, and the first and second locking features define a second, different distance between the terminal ends of the first and second locking features in response to the first and second locking features decompressing.

* * * * *